United States Patent
Rakshit

(10) Patent No.: US 11,556,449 B2
(45) Date of Patent: Jan. 17, 2023

(54) DIGITAL TWIN WORKFLOW SIMULATION

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 17/400,348

(22) Filed: Aug. 12, 2021

(65) Prior Publication Data

US 2021/0374032 A1 Dec. 2, 2021

Related U.S. Application Data

(63) Continuation of application No. 16/597,243, filed on Oct. 9, 2019, now Pat. No. 11,119,882.

(51) Int. Cl.
G06F 11/34 (2006.01)
G06F 11/30 (2006.01)

(52) U.S. Cl.
CPC ...... *G06F 11/3457* (2013.01); *G06F 11/3013* (2013.01); *G06F 11/3051* (2013.01); *G06F 11/3476* (2013.01); *G06F 11/3495* (2013.01)

(58) Field of Classification Search
None
See application file for complete search history.

(56) References Cited

U.S. PATENT DOCUMENTS

| 10,318,904 B2 | 6/2019 | Johnson |
| 2016/0328883 A1 | 11/2016 | Parfenov |
| 2018/0137219 A1 | 5/2018 | Goldfarb |
| 2020/0211699 A1 | 7/2020 | Nuthi |
| 2020/0310850 A1 | 10/2020 | Liguori |
| 2021/0109837 A1 | 4/2021 | Rakshit |

OTHER PUBLICATIONS

"How can Digital Twin technology improve your business?—Digital Twin explained", YouTube, Oct. 11, 2018, 2 pages, <https://www.youtube.com/watch?v=fEl5oz33la8>.

Florkowski et al., "Digital twins and simulations", ABB Review, Feb. 2019, 41 pages.

(Continued)

*Primary Examiner* — Craig C Dorais
(74) *Attorney, Agent, or Firm* — Christopher M. Pignato

(57) ABSTRACT

Systems, methods and computer program products for simulating workflows and activities of physical assets using digital twin models. User-defined simulations are performed by selectin digital twin components being analyzed during the simulation, concentrating the analysis on the selectively defined components and bypassing components that will not be simulated. Users can design the digital twin simulation using one or more available digital twin models. The model can be the most current digital twin model, a previous version of a model or a hybridized model comprising components or portions from multiple versions of the available digital twins. Users can further customize simulations by selecting components or sections of the digital twin model to selectively bypass during the simulation or provide overriding values for non-simulated portions of the digital twin which can be used as entry criteria inputted into the next simulated section or component of the digital twin, to complete the simulation.

20 Claims, 11 Drawing Sheets

(56) References Cited

OTHER PUBLICATIONS

Kennedy, Kara, "What is Digital Twins (+Impact on Business Modernization)", Jan. 18, 2018, 3 pages, <https://learn.g2.com/trends/digital-twins>.

Mell et al., "The NIST Definition of Cloud Computing", Recommendations of the National Institute of Standards and Technology, NIST Special Publication 800-145, Sep. 2011, 7 pages.

Wasserman, Shawn, "What is the Digital Twin and Why Should Simulation and IoT Experts Care?", posted on Nov. 27, 2017, 10 pages, <https://www.engineering.com/DesignSoftware/DesignSoftwareArticles/ArticleID/16070/What-is-the-Digital-Twin-and-Why-Should-Simulation>.

List of IBM Patents or Patent Applications Treated as Related. Filed Aug. 12, 2021, 2 pages.

DIGITAL TWIN WORKFLOW SIMULATION

TECHNICAL FIELD

The present disclosure relates generally to the field of digital twins and more specifically to digital twin simulations.

BACKGROUND

A digital twin is a virtual representation of a physical object, system or other asset. The digital twin tracks changes to the physical object, system or asset across the object's lifespan and records the changes as they occur. Digital twins are a complex virtual model that is an exact counterpart to the physical asset existing in real space. Sensors and internet-of-things (IoT) devices connected to the physical asset collect data, often in real-time. The collected data can then be mapped to the virtual model of the digital twin. Any individual with access to the digital twin can see the real-time information about the physical asset operating in the real world without having to be physically present and viewing the physical asset while operating. Rather, users such as engineers can use the digital twin to understand not only how the physical asset is performing, but to predict how the physical asset may perform in the future, using the collected data from sensors, IoT devices and other sources of data and information being collected. Moreover, digital twins can help manufacturers and providers of physical assets with information that helps the manufacturer understand how customers continue to use the products after the purchasers have bought the physical asset.

SUMMARY

Embodiments of the present disclosure relate to a computer-implemented method, an associated computer system and computer program product for executing a digital twin simulation that bypasses one or more input parameters. The computer-implemented method comprising capturing, by at least one processor, a real-time data feed from a data collection device connected to a physical asset to create a digital twin model representing the physical asset, wherein the real-time data feed describes components and performance of the physical asset and reflects the components and the performance of the physical asset in the digital twin model; creating, by the at least one processor, a plurality of separate versions of the digital twin model, wherein individual versions of the plurality of separate versions of the digital twin model reflect changes to the components and performance of the physical asset over time; configuring, by the at least one processor, input to a simulation of the physical asset by selecting at least one of the separate versions of the digital twin model to simulate and further selecting at least one component from the at least one of the separate versions of the digital twin model selected, to bypass during the simulation; and outputting, by the at least one processor, results of the simulation of the physical asset, based on configurations of the input provided to the simulation.

DETAILED DESCRIPTION

Figure 1:
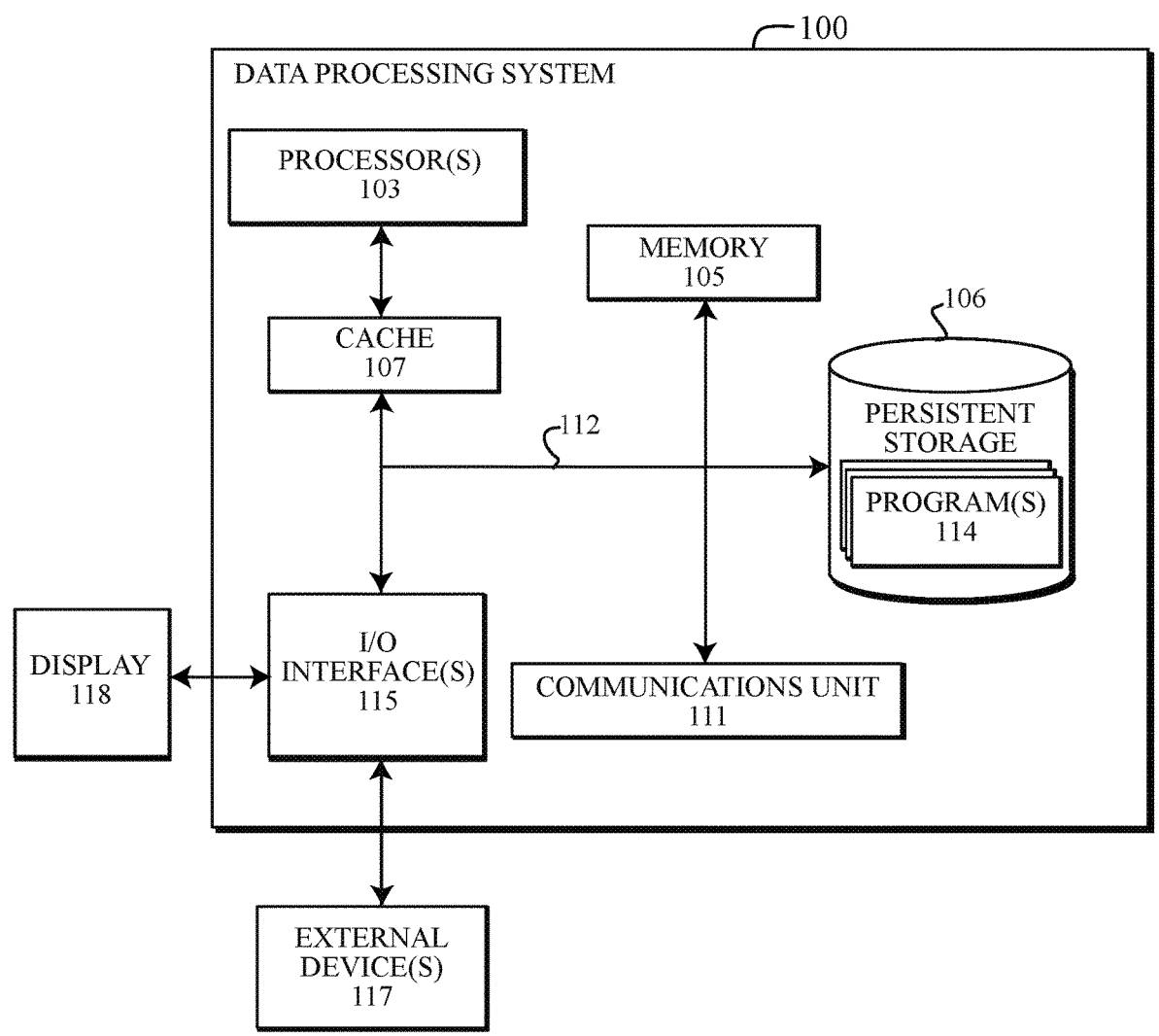
FIG. 1 depicts an embodiment of a block diagram of internal and external components of a data processing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

Overview

As physical assets change over time, through modifications, updates, wear, tear, or even damage, digital twins are mimic the changes to accurately reflect the changes to the physical asset over time. Real-time feeds from sensor devices, IoT devices, recording devices and other data streaming systems, capture performance information outputted by physical assets, monitor performance changes as a result of variations to a physical asset's configuration, design, components or maintenance. The real-time data collection of the digital twin allows for users of the digital twin, such as owners, operators, and engineers to predict future issues that may arise, solve functionality problems, optimize performance and simulate changes to the physical asset before implementation.

Owners, operators, and engineers of physical assets can use digital twins to diagnose problems within a physical asset or optimize asset configurations to achieve peak performance. However, embodiments of the present disclosure recognize that analyzing, diagnosing and optimizing performance of a physical asset through a digital twin does not always require analysis of the performance for the entire physical asset. Rather, concentrating the analysis on changes to specific components, configurations and modifications can pinpoint the performance changes or diagnose problems more efficiently. Embodiments of the present disclosure leverage customizable digital twin simulation configurations to improve the ability of users to identify both improvements and solve problems hampering physical asset performance or limiting the achievement of peak performance.

Embodiments of the present disclosure are directed toward computer-implemented methods, systems and computer program products for simulating digital twin performance, while selectively bypassing one or more input parameters, in accordance with user selections. Embodiments of the present disclosure allow users of the digital twins to selectively define digital components of the digital twin to concentrate on during the simulation, while bypassing certain components, substituting alternative components into the digital twin, providing overriding values for intermediate simulation results and validating simulation outputs. Users can design the digital twin simulation using one or more available digital twin models. The model can be the most current digital twin model, a previous version of a model or a hybridized model comprising components or portions from multiple versions of the available digital twins. Users can further customize simulations by selecting components or sections of the digital twin model to selectively bypass during the simulation or provide overriding values for non-simulated portions of the digital twin which can be used as entry criteria inputted into the next simulated section or component of the digital twin, to complete the simulation.

Data Processing System

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 100, which may be a simplified example of a computing system capable of performing the computing operations described herein. Data processing system 100 may be representative of the one or more computing systems or devices depicted in the computing environment 200, 260, 300, as shown in FIGS. 2a-8, and in accordance with the embodiments of the present disclosure. It should be appreciated that FIG. 1 provides only an illustration of one implementation of a data processing system 100 and does not imply any limitations regarding the environments in which different embodiments may be implemented. In general, the components illustrated in FIG. 1 may be representative of any electronic device capable of executing machine-readable program instructions.

While FIG. 1 shows one example of a data processing system 100, a data processing system 100 may take many different forms, including bare metal computer systems, virtualized computer systems, container-oriented architecture and microservice-oriented architecture. For example, data processing system 100 can take the form of real or virtualized systems including but not limited to personal desktop computer systems, laptops, notebooks, tablets, servers, clients, network devices, network terminals, thin clients, thick clients, kiosks, mobile communication devices (e.g., smartphones), multiprocessor systems, microprocessor-based systems, minicomputer systems, mainframe computer systems, smart devices, or Internet of Things (IoT) devices 221. The data processing systems 100 can operate in a networked computing environment 200, containerized computing environment 260 and/or a distributed cloud computing environment 300, which can include any of the systems or devices described herein and/or additional computing devices or systems known or used by a person of ordinary skill in the art.

Data processing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, communications, and network processors, etc.), memory 105, external devices 117, and any other hardware components within a data processing system 100. For example, communications fabric 112 can be implemented as one or more buses, such as an address bus 305 or data bus 307.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Program(s) 114, software applications 223, user processes and services, described herein, may be stored in memory 105 and/or persistent storage 106 for execution and/or access by one or more of the respective processor(s) 103 of the computer system 100.

Persistent storage 106 may include a plurality of magnetic hard disk drives. Alternatively, or in addition to magnetic hard disk drives, persistent storage 106 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between data processing systems 100. For example, between one or more computer systems or devices via a communication network 250. In the exemplary embodiment, communications unit 111 may include network adapters or interfaces such as a TCP/IP adapter cards, wireless Wi-Fi interface cards, 3G, 4G, or 5G wireless interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks including devices, host system(s) 201, terminals or other network computer systems. Software and data used to practice embodiments of the present disclosure can be downloaded to the computer systems operating in a network environment through communications unit 111 (e.g., via the Internet, a local area network or other wide area networks). From communications unit 111, the software and the data of program(s) 114 can be loaded into persistent storage 106.

One or more I/O interfaces 115 may allow for input and output of data with other devices that may be connected to data processing system 100. For example, I/O interface 115 can provide a connection to one or more external devices 117 such as one or more smart devices, IoT devices 221, recording systems 223 such as an audio system, camera systems, one or more sensor device(s) 219, input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, a computer monitors or screens. Human-readable display 118 can also be an incorporated display and may function as a touch screen, such as a built-in display of a tablet computer.

System for Simulating a Digital Twin Workflow

Referring to the drawings, FIGS. 2a-8 depict an approach that can be executed using one or more data processing systems 100 operating within a computing environment 200, 260, 300 to implement systems, methods and computer program products for simulating digital twin workflows of physical assets 217, simulations of hypothetical configurations of physical assets 217 comprising components from multiple versions of digital twin models 233 and simulations of digital twins using one or more bypassed input parameters. Embodiments of computing environments 200, 260, 300 may include one or more data processing systems 100 interconnected via a device network 250. The data processing systems 100 connected to the device network 250 may be specialized systems or devices that may include, but are not limited to, the interconnection of one or more host system 201, physical asset 217 which may comprise one or more sensor device(s) 219 and/or IoT device(s) 221, a network-accessible repository 231 and at least one client system 227a-227c (referred to generally as "client system 227").

The data processing systems 100 exemplified in FIGS. 2a-8, may not only comprise the elements of the systems and devices depicted in the drawings of FIGS. 2a-8, but these specialized data processing systems depicted may further incorporate one or more elements of a data processing system 100 shown in FIG. 1, and described above. Although not shown in the figures, one or more elements of the data processing system 100 may be integrated into the embodiments of host system 201, physical asset 217, sensor device(s) 219, IoT device(s) 221, recording systems(s) 223, computing systems that are hosting repository 231, and client systems 227, including (but not limited to) the integration of one or more processor(s) 103, program(s) 114, memory 105, persistent storage 106, cache 107, communications unit 111, input/output (I/O) interface(s) 115, external device(s) 117 and human-readable display 118.

Embodiments of the host system 201, physical asset 217, client system 227, repository 231 and other data processing systems 100, may be placed into communication with one another via computer network 250. Embodiments of network 250 may be constructed using wired, wireless or fiber-optic connections. Embodiments of the host system 201, physical asset 217, sensor device(s) 219, IoT device(s) 221, recording systems(s) 223, repository 231, and client systems 227 and other data processing systems 100, may connect and communicate over the network 250 via a communications unit 111, such as a network interface controller, network interface card or other network communication device capable of facilitating a connection with network 250. In some embodiments of computing environments 200, 260, 300, one or more embodiments of the host system 201, physical asset 217, sensor device(s) 219, IoT device(s) 221, recording systems(s) 223, repository 231, and client systems 227, may represent a data processing systems 100 utilizing clustered computers and components acting as a single pool of seamless resources when accessed through network 250. For example, such embodiments can be used in a data center, cloud computing, storage area network (SAN), and network-attached storage (NAS) applications.

Embodiments of the communications unit 111 may implement specialized electronic circuitry, allowing for communication using a specific physical layer and a data link layer standard. For example, Ethernet, Fiber channel, Wi-Fi or Token Ring to transmit data between the host system 201, physical asset 217 client system 227, repository 231 and other data processing systems 100 connected to network 250. Communications unit 111 may further allow for a full network protocol stack, enabling communication over network 250 to groups of host systems 201, physical assets 217 client systems 227, repository 231 and other data processing systems 100 linked together through communication channels of network 250. Network 250 may facilitate communication and resource sharing among the host system 201, physical asset 217 client system 227, repository 231 and other data processing systems 100 (for example, network-accessible storage media) connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 250 of interconnected nodes 310.

Figure 3:
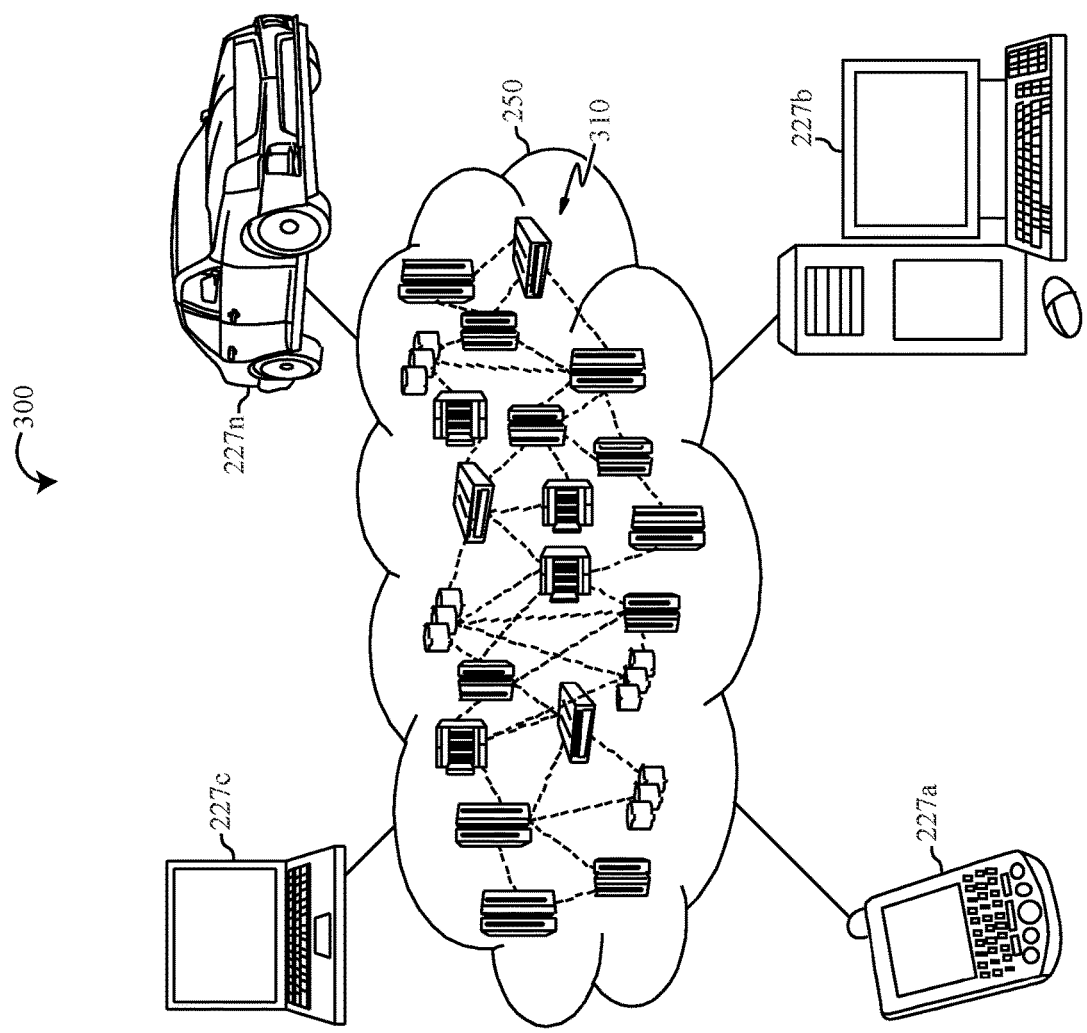
FIG. 3 depicts an embodiment of a cloud computing environment within which embodiments described herein may be implemented in accordance with the present disclosure.

Referring to the drawings, FIG. 3 is an illustrative example of a cloud computing environment 300. As shown, cloud computing environment 300 includes one or more cloud computing nodes 310 with which client systems 227 operated by the cloud consumers, may communicate with the cloud computing environment 300. For example, client systems 227a, 227b, 227c, 227n as illustrated in FIG. 3. Nodes 310 of the cloud computing environment 300 may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on a client system 227. It is understood that the types of client systems 227 connected to the cloud computing environment 300, are intended to be illustrative only and that computing nodes 310 of the cloud computing environment 300 can communicate with any type of computerized device over any type of network and/or network addressable connection (e.g., using a web browser).

Figure 4:
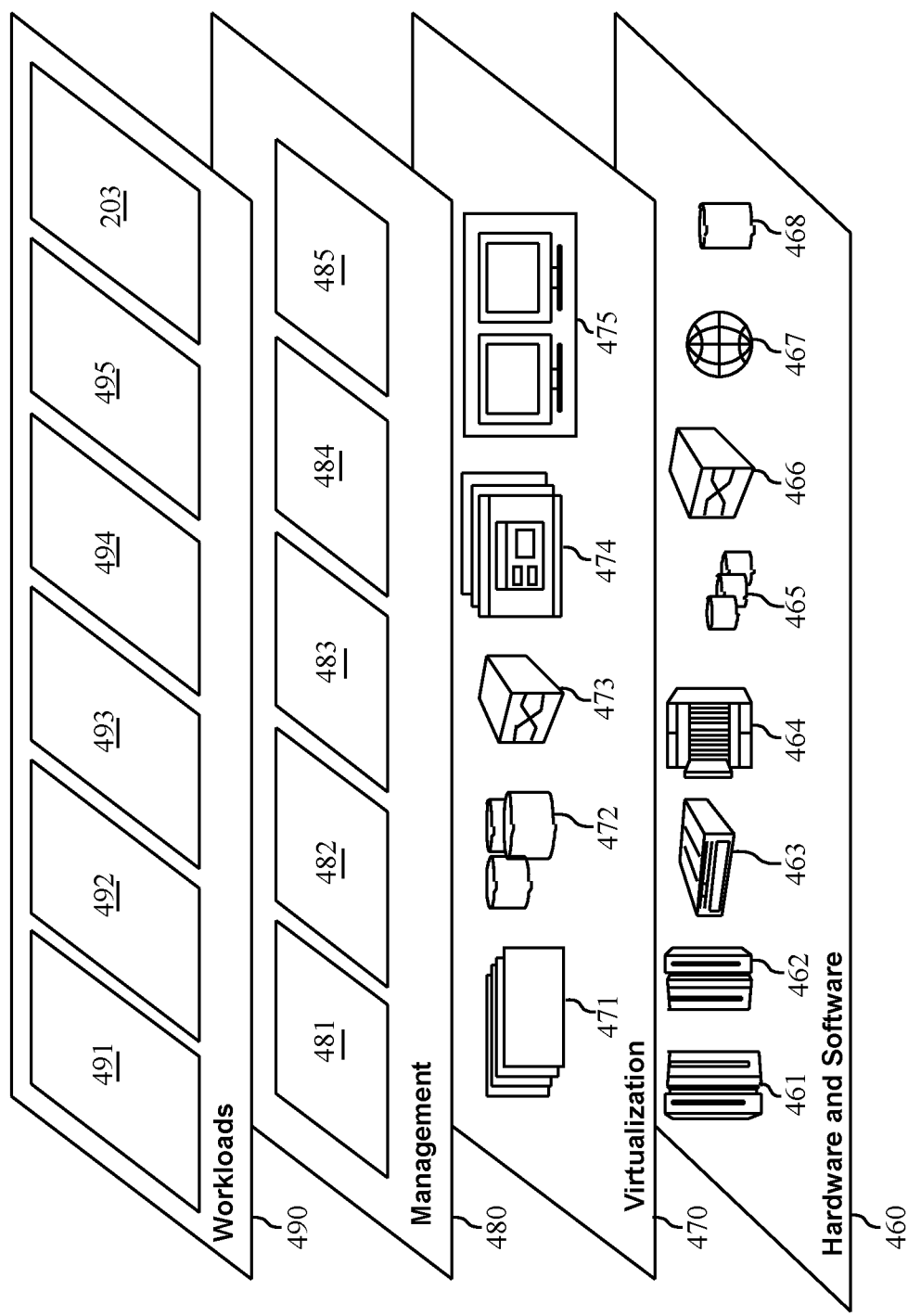
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, virtual classroom education delivery 493, data analytics processing 494, transaction processing 495, and digital twin services provided by digital twin module 203.

Figure 2A:
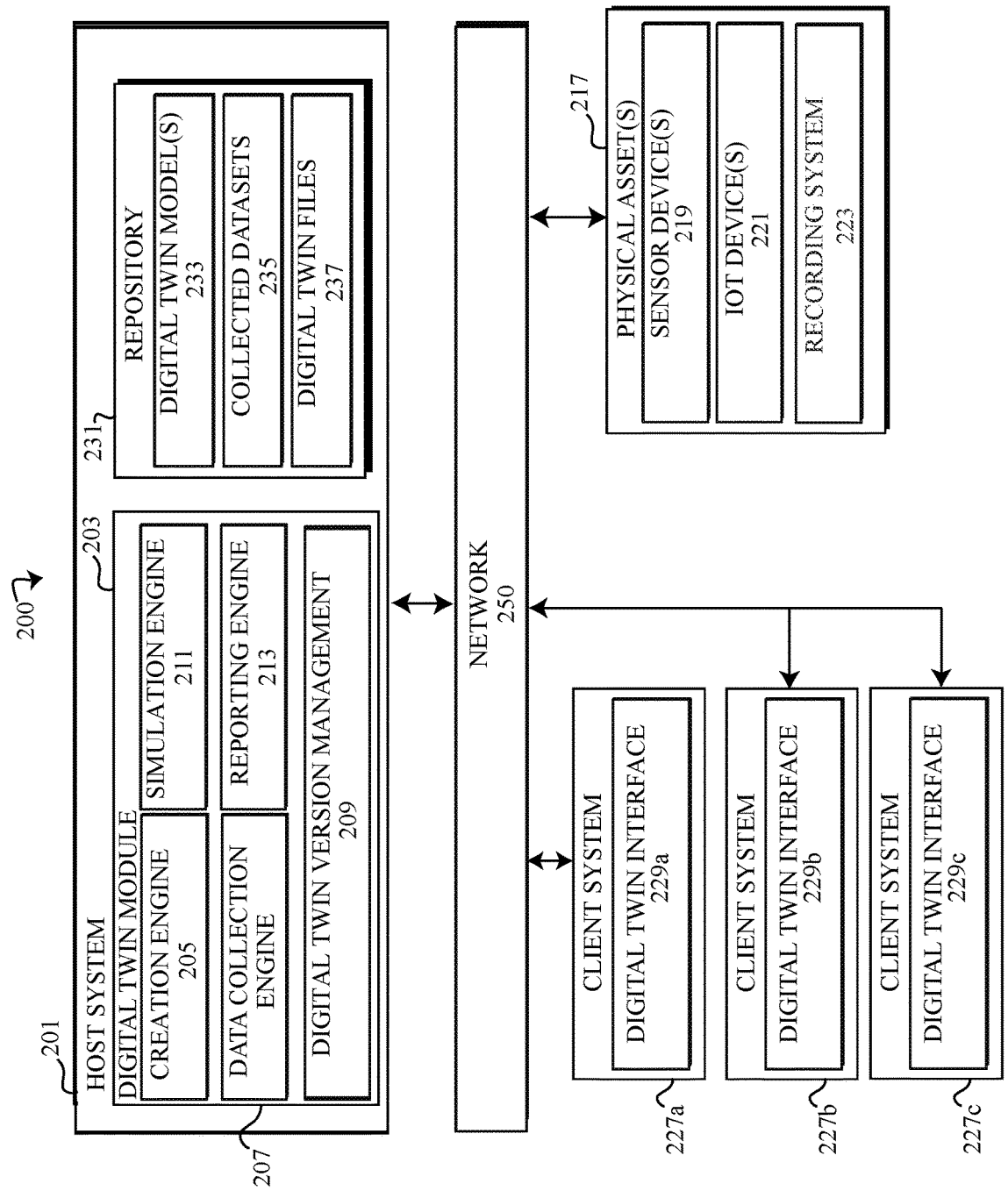
FIG. 2a depicts a block diagram of an embodiment of a computing environment for creating and simulating a digital twin in accordance with the present disclosure.

Referring back to the drawings, FIG. 2a depicts an embodiment of a computing environment 200 capable of executing digital twin simulations using one or more versions of a digital twin model 233, hybrid versions comprising digital twin model 233 components and/or digital twin models 233 with one or more hypothetical components. Embodiments of computing environment 200 can comprise a device network 250 connecting a plurality of specialized data processing systems 100, including (but not limited to) interconnecting a host system 201, physical asset(s) 217, which may include one or more sensor device(s) 219, IoT Device(s) 221, and recording system(s) 223, one or more client systems 227 and repository 231. The data processing systems 100 of the computing environment 200 depicted, may comprise specialized configurations of hardware, software or a combination thereof, as shown and described herein, including specialized modules for implementing one or more particular tasks, functions or operations associated creating versions of digital twin models 233, managing multiple versions of the digital twin, collecting sensor, IoT and recording data from the physical asset 217, performing simulations and reporting simulation results. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one of the data processing systems 100 operating as part of the computing environment 200. For example, the digital twin module 203 depicted in FIG. 2a may be loaded into the memory 105 or persistent storage 106 of host system 201.

As shown in the exemplary embodiment of FIG. 2a, embodiments of the computing environment 200 may include a host system 201. The host system 201 may be a computer system or another type data processing system 100 connected to network 250, which can provide services to other systems or users connected to the network 250. As shown in FIG. 2a, the host system 201 may provide digital twin services via the digital twin module 203 to users connecting and accessing the digital twin module 203 via a client system 227 through a digital twin interface 229a-229c (referred to generally as "digital twin interface 229"). The digital twin services may be provided to owners, purchasers, licensees, manufacturers, sellers, licensors and other authorized individuals (collectively referred to generally as "users") of the digital twins being accessed. Users may connect to the host system 201 and access the services of the digital twin module 203 via one or more client systems 227. Embodiments of the host system 201 may execute program code of the digital twin module 203 to perform one or more functions or operations of the digital twin module 203, including, but not limited to retrieving and creating digital twin models 233, aggregating and organizing data generated by sensor device(s) 219, IoT devices 221 and/or recording system 223 of the physical asset(s) 217, simulating changes to the digital twin using one or more digital twin models, mapping simulation components of the digital twin models 233, selecting components to bypass and alternative components to substitute for bypassed components 701, providing overriding values 803, and reporting simulation results to the user. One or more individual functions or features of the digital twin module 203 may be implemented by one or more subprocesses or sub-modules of the digital twin module 203. For example, the exemplary embodiment of the digital twin module 203, comprises a creation engine 205, data collection engine 207, digital twin version management 209, simulation engine 211, and reporting engine 213.

Figure 5:
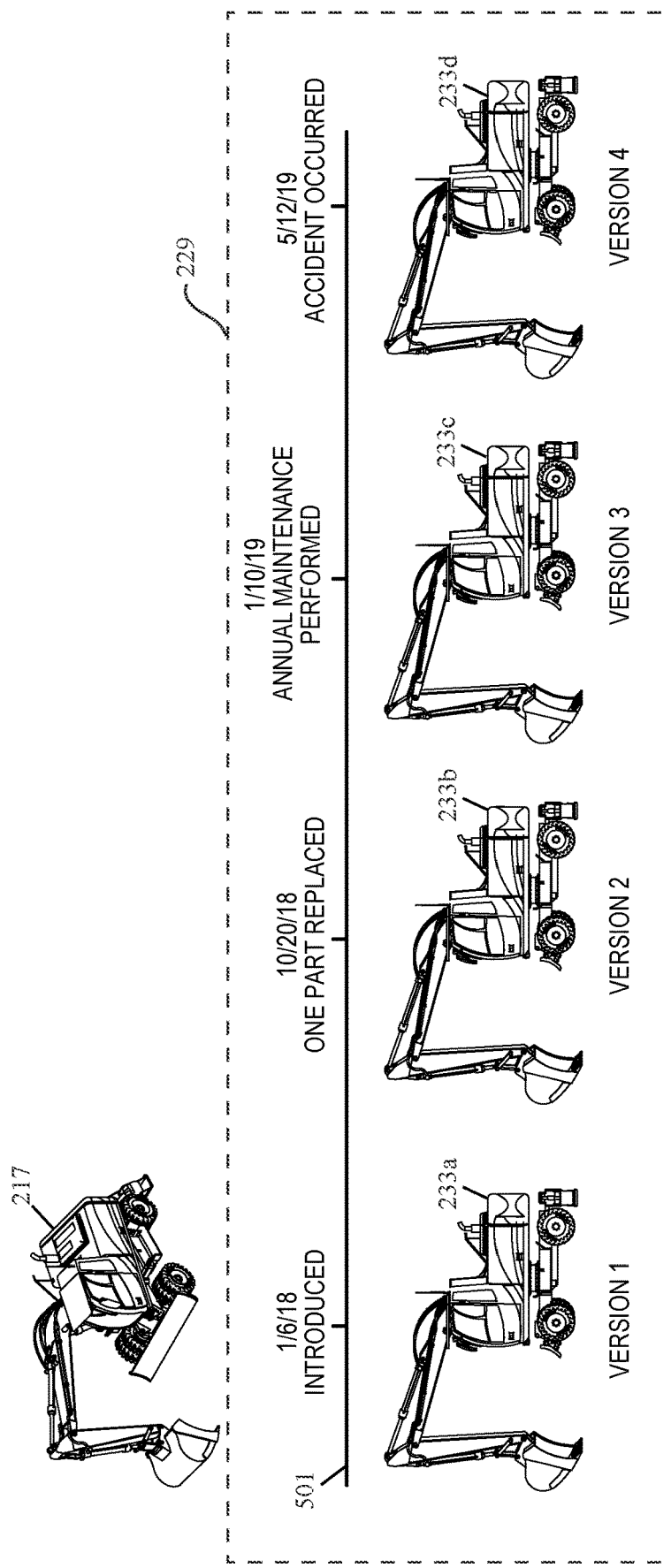
FIG. 5 provides an illustration depicting an embodiment of a time-based scale describing a plurality of digital twin versions, in accordance with the present disclosure.

Embodiments of the creation engine 205 may perform tasks or functions associated with creating a digital twin model 233 reflecting a current state of a physical asset 217 or the creation engine 205 may associate existing digital twin models 233 with a new user or owner who may be receiving an existing digital twin. For example, a user purchasing a previously used product that was previously owned or used that has an associated digital twin model(s) 233 that have been previously created and have been transferred to the new owner. In some embodiments, initial versions of the digital twin models 233 depicting the base form of a physical asset 217 provided by the manufacturer at the time of purchase, may be provided to the digital twin module 203 and/or stored by the repository 231 as a digital twin model 233 or as part of one or more digital twin files 237. In other embodiments, the creation engine 205 may receive specifications of the physical assets 217 from the manufacturer in the form of one or more digital twin files 237 describing the physical asset 217. Embodiments of the creation engine 205 may create a digital twin model 233 depicting the original base form of the physical asset 217 as supplied (e.g., referred to as the "base asset"). An example of a base asset depicting the physical asset 217 at the time the physical asset 217 was provided to the owner can be seen in FIG. 5. As shown in the example of FIG. 5, the digital twin model 233a, depicts version 1 of the physical asset 217 at the time the physical asset 217 is received.

Embodiments of the creation engine 205 may further create additional digital twin models 233 representing versions of the physical asset 217 over time. As the physical asset changes over time, including changes to one or more components, configurations, hardware, software, firmware, sensors 219, IoT devices 221, recording systems 223, maintenance, repairs, etc., the creation engine 205 may create a new digital twin model 233 reflecting the current state and/or condition of the physical asset 217 as a digital twin. Embodiments of the creation engine 205 may store the plurality of different digital twin models 233a-233d in repository 231. In some embodiments, the multiple versions of the digital twin models 233 can be sequenced or stored using a time-based scale and/or timeline 501 to track the evolution of the physical asset 217 and the subsequent changes to the physical asset 217. As shown in FIG. 5, timeline 501 depicts four versions of the physical asset 217 at various points in time. Each point in time is reflected by a new digital twin model 233a-233d that may be created by the creation engine 205 to catalog the changes to the physical asset 217.

Changes to the digital twin model 233 that may result in the creation of a new digital twin model 233 may be self-reported by users or owners of the physical asset 217 in some instances. For example, a user may perform repairs, maintenance, reconfigure settings and/or install or remove components on the physical asset 217 and report the imposed changes to the digital twin module 203. In response to the reported changes, the creation engine 205 may create a new version of the digital twin model 233 to reflect the reported changes and store the new digital twin model 233 within repository 231 and/or as part of the timeline 501 tracking the evolution of the physical asset 217. In other instances, embodiments of the digital twin model 233 may be tracked based on changes to performance data collected by one or more sensor devices 219, IoT devices 221 and/or recording systems 223 connected to the physical asset 217. Collected performance data and other data describing the physical asset 217 may indicate the presence of changes to the physical asset 217. Accordingly based on changes to the collected data being monitored, new digital twin models 233 may be created. For instance, one or more parts or components connected to the physical asset 217 may communicate or broadcast information to the devices 219, 221, 223 collecting data about the physical asset 217, including makes and models of the component. If new components or parts are detected, such a change may be relayed to the digital twin module 203, resulting in the creation of a new digital twin model 233 to reflect changes of the physical asset 217.

In some embodiments, the presence of new components, configurations or other changes to the physical asset 217 may be deduced by the performance characteristics of the data collected by the devices 219, 221, 223 monitoring the physical asset 217. Deviations between previously collected performance data and current data sets of performance data can result in an identification of changes to the physical asset 217 and/or the health of the physical asset 217. For example, changes in performance may indicate the presence of new parts or components, modified configurations, software or firmware update, damage, repairs, etc. Embodiments of the digital twin module 203 may analyze the performance changes based on the changes in the performance data collected and reflect the changes to the physical asset 217 as a new digital twin model 233 in some embodiments. In other embodiments, the digital twin module 203 may alert the user of the detected changes in performance data and request updated information from the user about the physical asset 217 to ascertain one or more changes to the physical asset that may be responsible for the observed performance changes and create a new digital twin model 233 in accordance with the reported changes.

Embodiments of the digital twin module 203 may comprise a data collection engine 207. The data collection engine 207 may perform the functions, tasks or operations associated with collecting, organizing, maintaining, formatting and/or storing performance data and other data sets (collectively referred to as "collected datasets 235") generated by the sensor device(s) 219 IoT device(s) 221, and/or recording system(s) 223 connected to or communicating with the physical asset 217. The collected datasets 235 generated by the sensor device(s) 219, IoT device(s) 221 and/or recording system 223 of the physical asset 217, may be stored in one or more data storage solutions, which may be part of one or more data processing systems 100 onboard the physical asset 217 in some embodiments. In some embodiments, data collected by the data collection engine 207 may be captured as a real-time data feed streamed by one or more data collection devices 219, 221, 223 providing the data to the data collection engine 207. In other embodiments, the data storage maintaining the collected datasets 225 may be distributed across the network 250 and/or stored locally by the host system 201 (as shown in FIG. 2a) or a networked-connected data storage systems such as repository 231 as reflected in FIG. 2b.

During operation of the physical asset 217, sensor devices 219, IoT devices 221 and recording systems 223 equipped by the physical asset 217 can generate data describing the operation, functionality and performance of the physical asset 217. The collected datasets 235 that are generated by the devices 219, 221, 223, can describe the overall health and performance of the physical asset 217 in its current state, help diagnose potential maintenance needs, repairs or failing parts that may need replacement. Embodiments of the sensor devices 219, IoT devices 221 and recording systems 223 integrated into the physical asset 217 can also provide error or diagnostic codes, which may further assist with identifying potential issues, that may alert the user or owner of pending problems with physical asset 217. Through the use of the collected datasets 235, organized, analyzed and/or formatted by the data collection engine 207, the digital twin module 203 may analyze the physical asset's 217 performance, identify failing parts, provide resolutions to cure errors or diagnostic codes and recommend optimal actions to improve or optimize performance of the physical asset 217 based on one or more simulations performed by the host system 201 and detect the presence of new versions of the physical asset 217 which can be replicated as a new digital twin model 233 by the creation engine.

Embodiments of the digital twin module 203 may further use the collected data to aid in the performance of one or more simulations that may simulate physical asset 217 performance within the digital twin or provide simulations using various scenarios of the digital twin to predict results for performing changes to the digital twin's configuration. For example, simulations predicting effects of replacing particular parts, adjusting timings, modifying onboard electrical or computing components or even replacing potentially defective sensors 219, IoT devices 221, recording systems 223. Collected datasets 235 collected by the data collection engine 207 may contribute to building one or more simulation models that may be used by the simulation engine 211. In some embodiments, manufacturers and/or users of the physical asset 217 may share the collected datasets 235 amongst owners of the same physical asset 217 or base asset, to improve modeling that uses the data, increasing the overall amounts of data available amongst the community of owners, thus improving the prediction models and creating improved simulation results. For example, collected datasets 235 may be shared with the physical asset's 217 manufacturer and in turn, performance data collected by the manufacturer's customers for a particular physical asset 217 may be aggregated into predictive models and shared amongst the manufacturer's customers, if the user of the physical asset 217 elects to participate in the sharing program.

Embodiments of the digital twin module 203 may comprise a digital twin version management module 209 (referred to herein as "version management 209"). Version management 209 may control and input requests to the creation engine 205 to create new digital twin models 233. For example, based on input from the user indicating changes to the physical asset 217 and/or based on identified changes to the physical asset 217 derived from performance data collected by the data collection engine 207. Embodiments of version management 209 may be responsible for creating and updating timeline 501, time stamping new versions of digital twin models 233 to reflect when the models are created, detailing one or more changes between the newly created digital twin models 233 and the previous version thereof. In some embodiments, version management 209 may log version changes in one or more log files and store updated log files as part of the digital twin files 237 stored by repository 231. In some embodiments, timeline 501, being managed by version management 209 may provide a brief summary differentiating changes amongst the versions of the digital twin models 233. For example, in FIG. 5, brief descriptions of the changes to the digital twin models 233 are provided on the timeline 501. For instance, digital twin model 233a is denoted as the version of the physical asset 217 when the physical asset was first introduced, while model 233b indicates the reason for the new digital twin model 233b was due to a replacement of a part. Likewise, version 3 represented by digital twin model 233c indicates a new model 233c was created to reflect annual maintenance while version 4 represented by digital twin model 233d reflects the results of an accident occurring to the physical asset 217.

Embodiments of the digital twin module 203 may comprise a simulation engine 211. Embodiments of the simulation engine 211 may perform simulations of physical asset 217 operations using one or more digital twins to predict performance of the physical asset 217 in the current state, a previous state or in a hypothetical configuration. Simulations performed by the simulation engine 211 may execute simulations using one or more input parameters corresponding to a selected digital twin model 233, overriding values 803, as well as performance data for each digital twin model 233 aggregated by the data collection engine 207 from one or more sensor devices 219, IoT devices 221 and recording systems 223 connected to the physical asset 217 and stored as collected datasets 235 in repository 231. Embodiments of the simulation engine 211 may perform digital twin simulations of the physical asset 217 using one or more versions of the digital twin models 233 created and stored by the repository 231, as part of the timeline 501, describing the evolution of the physical asset 217. For instance, in some embodiments, a user can select to run a simulation using the most current digital twin model 233, a previous version of a digital twin model 233 and/or a digital twin model 233 of the base asset form of the physical asset 217, when the physical asset was first provided to the user. For example, based on the timeline depicted in FIG. 5, a user could select a version of the physical asset 217 from digital twin model 233a-233d.

In some embodiments, the user may further modify a selected digital twin model 233 to use during a simulation, from existing digital twin models 233 that may be available and stored in repository 231, and/or part of the time-based scale describing the versions of the digital twin models on timeline 501. For example, prior to the execution of the simulation by the simulation engine 211, the user can select a version of the digital twin model 233 and modify the digital model 233 by replacing one or more components or configurations to simulate the results that could occur by making such replacements or configurations to the physical asset 217. For example, a user selects a digital twin model 233 representing the physical asset 217 in the physical asset's current state and rather than simulating the current state of the physical asset 217, the user substitutes the current motor equipped in the physical asset 217 with a new motor being considered to replace the current motor by the user. The new motor being considered can be substituted in the selected digital twin model 233 and the simulation may provide simulation results predicting the impact of replacing the current motor of the physical asset with the new motor selected by the user.

Figure 6:
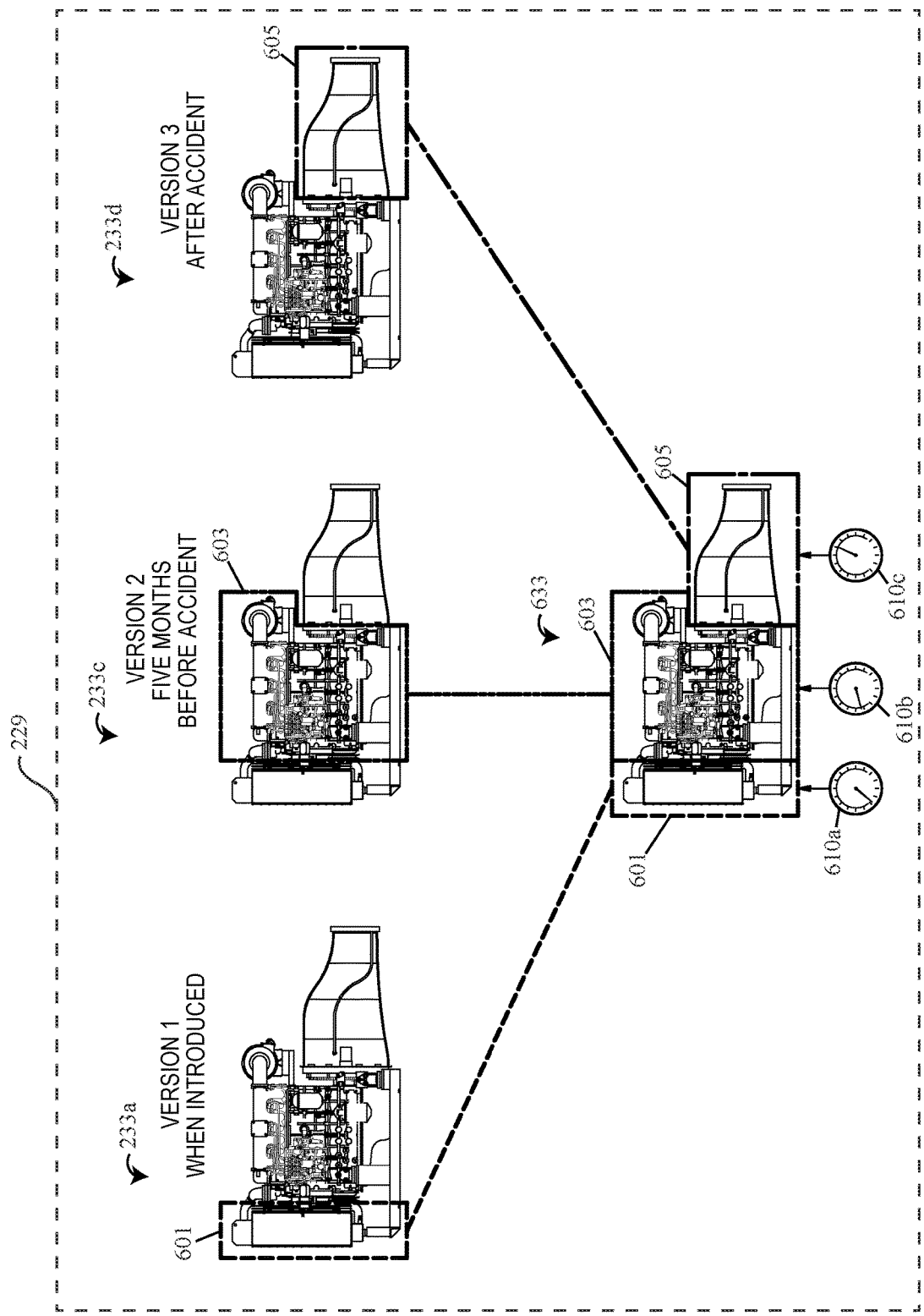
FIG. 6 provides an illustration depicting an example of a hybrid digital twin model comprised of selected component(s) or portions of two or more digital twin models.
Figure 7:
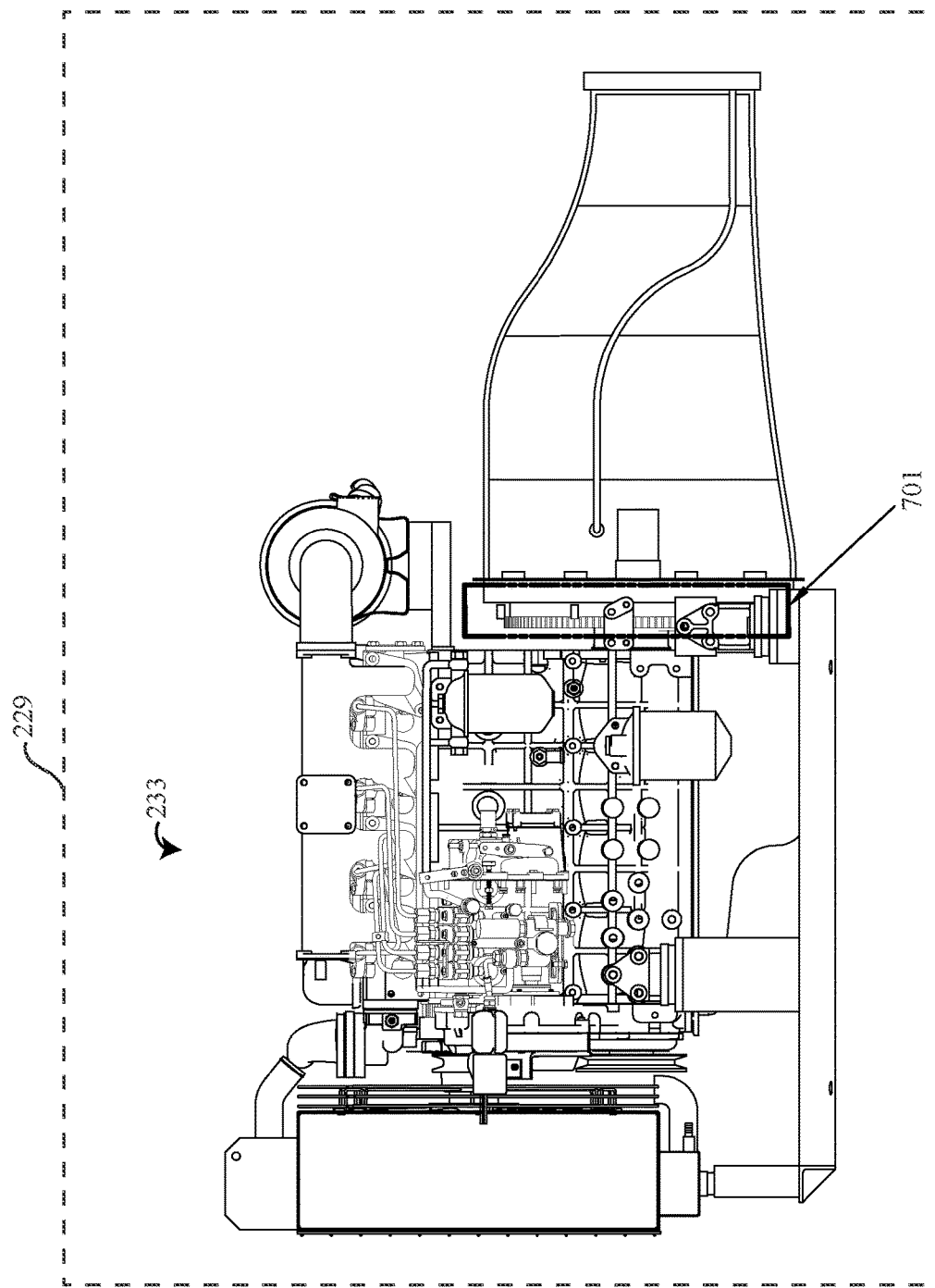
FIG. 7 provides an illustration depicting a selected component to bypass during a simulation, in accordance with the present disclosure.
Figure 8:
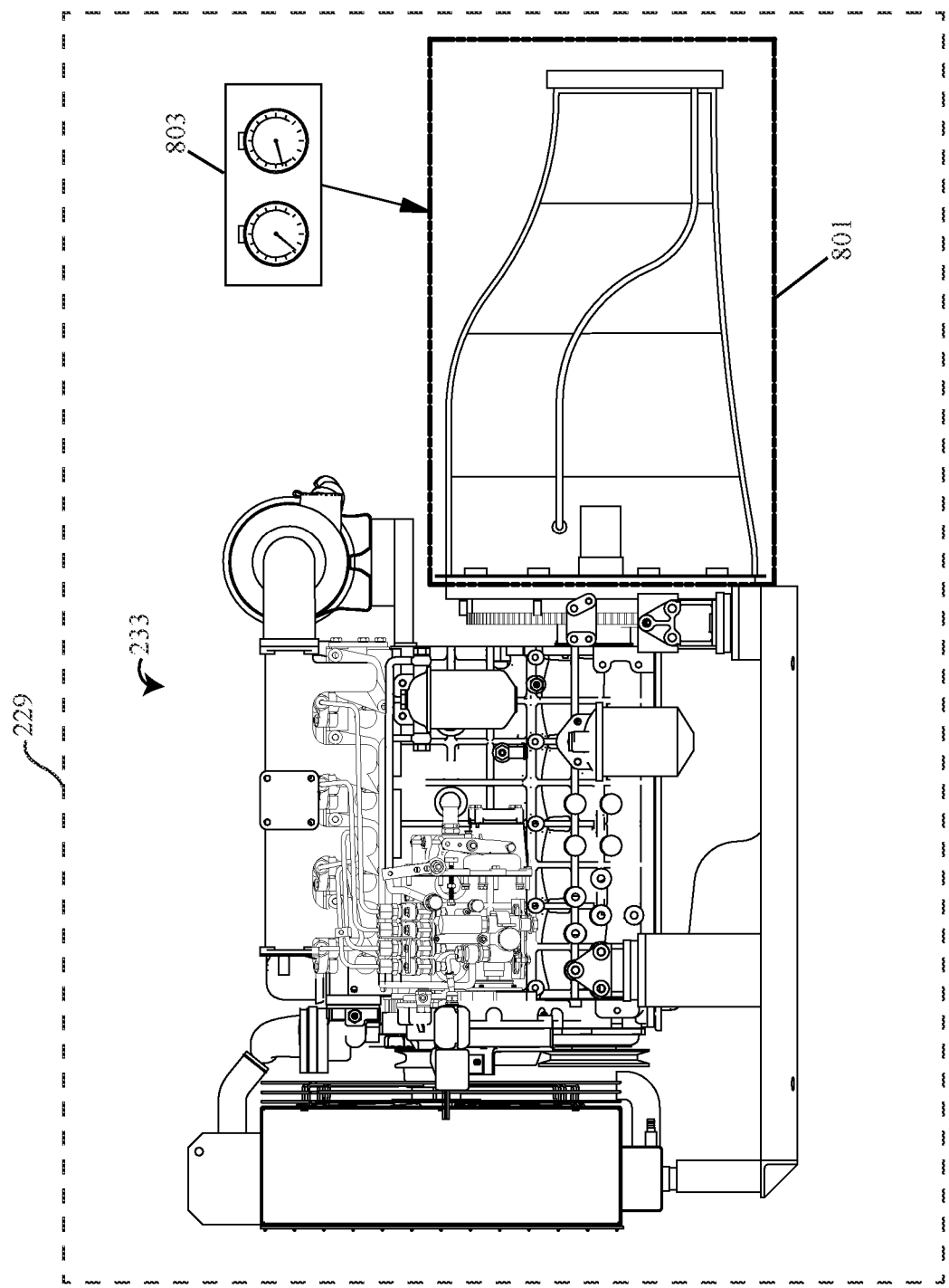
FIG. 8 provides an illustration depicting a selected component for simulation and an overriding value inputted into the selected component representing an intermediate simulation result of a non-simulated component(s), in accordance with the present disclosure.

Embodiments of the simulation engine 211 may provide users an opportunity to run simulations of digital twin models 233 using a hybrid model 633 comprising components or configurations of digital twins from a plurality of different versions of the digital twin models 233. For example, mixing and matching components or configurations of two or more digital twin models 233 to create a hybrid model 633 for the simulation. An example of the construction of a hybrid model 633 is shown in FIG. 6. Use of a hybrid model 633 can assist a user to make determinations about the various components. For instance, users configuring the simulation and reviewing simulation results can pinpoint which components can be reused, replaced, upgraded, etc. As shown by the example in FIG. 6, a hybrid model 633 can be constructed from a plurality of components or portions 601, 603, 605 selected from digital twin models 233a, 233c and 233d. Although FIG. 6 depicts the creation of a hybrid model 633 from three different digital twin models, a person skilled in the art would recognize that a hybrid model 633 can be created from any number digital twin models 233 and more specifically two or more digital twin models 233. As provided in the exemplary embodiment of FIG. 6, the hybrid model 633, is constructed from a first component 601 (or set of components) from digital twin model 233a combined with a second component 603 (or set of components) from digital twin model 233c and a third component 605 (or set of components) from digital twin model 233d.

In some embodiments, augmented reality (AR) may be provided to users and integrated into the digital twin interface 229. For example, users building hybrid models 633 may use AR devices such as glasses or headsets to view one or more digital twin models 233 virtually overlaid in AR space onto a physical space. User's may interact with the digital twin model 233 being displayed by the AR device by touching or selecting one or more components that are displayed, as a method for indicating which components from the digital twin models 233 may be included in the hybrid model 633 from each digital twin model 233. Users may view multiple digital twin models 233 using an AR device and construct the hybrid model 633 in real time as the user makes component selections, for example, by touching the displayed digital twin models 233 displayed in the AR space and mapping the portions associated with each selected digital twin model to incorporate into the hybrid model 633.

Output from simulations executed using a hybrid model 633 may include intermediate simulation results 610a, 610b, 610c (referred to generally as "intermediate results 610") which may feed into downstream simulations of other intermediate components before returning a final simulation result. In some embodiments, users can verify and/or record intermediate results 610 before proceeding to the next stage of the simulation and/or the next downstream component of the hybrid model 633. For example, referring to FIG. 6, a simulation of hybrid model 633 may be performed by first simulating a first component 601 (or set of components)

from digital twin model 233*a*. The simulation engine 211 outputs an intermediate simulation result 610*a* describing the simulation of the first component(s) 601, which may be verified by the user. The intermediate result 610*a* may be provided as an input value for the second component(s) 603 of the hybrid model 633. Using the intermediate result 610*a* obtained from simulating component 601, component 603 run a second intermediate simulation and return intermediate result 610*b* describing the simulation of component 603 using the intermediate result 610*a* as the input for the simulation of component 603. Accordingly, the simulated output generated by component 603 as intermediate result 610*b* may be further verified by a user and/or further provided as input for the simulation of the downstream, third component(s) 605, which derives from digital twin model 233*d*. Accordingly, the third component 605 may be simulated by the simulation engine 211 using intermediate result 610*b* as the initial input into the third component 605. Since component 605 is the final set of components in the hybrid model of FIG. 6, result 610*c* may represent the final results outputted by the simulation engine. However, in a hybrid model 633 wherein third component 605 is not the final set of components being simulated, results 610*c* may be considered another set of intermediate results that may be provided to the subsequent components downstream from the third component 605 as input to continue the simulation.

Embodiments of the simulation engine 211 may further provide functions for bypassing selected components of a digital twin model 233 and/or hybrid model 633 being simulated by the simulation engine 211. For example, while mapping the simulation to be performed using an AR device, a user can select one or more portions and/or components of the digital twin model 233 or hybrid model 633 to bypass during the simulation. Bypassing one or more portions or components of the digital twin being simulated may help to isolate and predict the effects of the bypassed components 701 on the performance of the physical asset 217. In some embodiments, the bypassed component 701 of the selected simulation model may be selectively alternated with different substituted components each time a simulation is run to detect the impact of the bypassed component 701 on the performance of the digital twin. For example, multiple simulations may be performed using the same selected simulation model (i.e., a current model, previous model, hybrid, etc.), with the only change being the alternate components substituted for the bypassed component 701. Accordingly, as the bypassed component 701 is changed with the selected alternates, the outputted results of the simulations can provide insight into the effects of the bypassed component 701 on the simulation model and ultimately predict the effects substituting the bypassed component 701 for the alternate components within the physical asset 217.

In some embodiments of the simulation engine 211, the simulation engine 211 may isolate a simulation to a selected portion 801 of the digital twin being used as the simulation model, instead of executing a full simulation which may simulate every aspect of the simulation model selected by the user. Embodiments of the simulation engine 211 may allow for a user to select one or more portions or components of the selected simulation model to simulate. Based on the user-selected portion 801 being simulated, the simulation engine 211 may calculate the input parameters that should be defined by the user as an overriding intermediate values 803 to provide as input into the selected portion 801 being simulated. Before executing the simulation of the selected portion 801, simulation engine 211 may notify the user of the needed overriding intermediate values 803 and request input from the user. The overriding intermediate values 803 can be inputted into the selected simulation model upstream from the selected portion being simulated and used as an input value into the selected portion 801, simulating the receipt of output of an intermediate value 803 from a previously simulated upstream component or set of components. Accordingly, upon executing the simulation, the simulation engine 211 may output the results of the simulation based on the input of the overriding intermediate value 803 and return an output returned for the selected portion 801 as a final simulation result.

Embodiments of the digital twin module 203 may comprise a reporting engine 213. Embodiments of the reporting engine 213 may perform functions or tasks of the digital twin module 203 which may be directed toward receiving simulation results from the simulation engine 211, transmitting the simulation results to one or more client systems 227 and displaying the simulation results on the digital twin interface 229. In some embodiments of the reporting engine 213, the reporting engine 213 may save and archive the simulation results to the digital twin files 237 of repository 231. Users of the digital twin module 203 may request the reporting engine 213 to retrieve archived simulation results from previous simulation and view the archived simulation results on the digital twin interface 229. Embodiments of the reporting engine 213 may also be capable of accessing and providing to the user one or more available publicly shared simulation results from owners and users of similar physical assets 217.

Figure 2B:
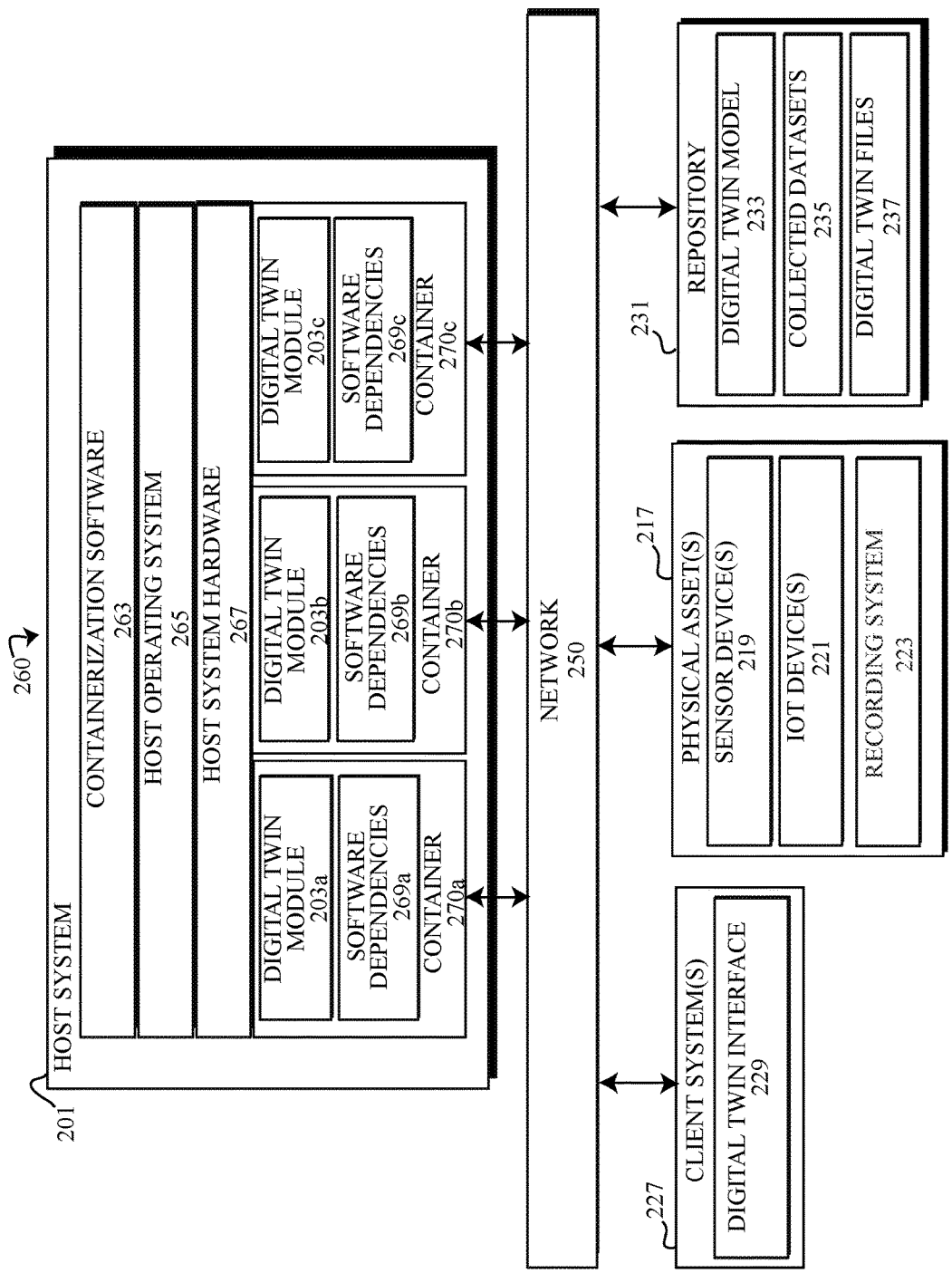
FIG. 2b depicts a block diagram of an alternate embodiment of a computing environment for creating and simulating a digital twin in accordance with the present disclosure.

Referring to the drawings, FIG. 2*b* depicts an alternative embodiment, comprising computing environment 260, wherein host system 201 containerizes the digital twin module 203 into multiple container environments (depicted as container 270*a*-270*c*), containing a digital twin module 203*a*-203*c* and the software dependencies 269*a*-269*c*, within the container's 270 operating environment. The host system 201 may run a multi-user operating system (i.e., the host operating system 265) and provide computing resources via the host system hardware 267 to one or more containers 270*a*-270*c* (referred to generally as containers 270) comprising the containerized computer environment for the digital twin module 203 software to execute and perform functions of the digital twin module 203.

Embodiments of computing environment 260 may be organized into a plurality of data centers that may span multiple networks, domains, and/or geolocations. The data centers may reside at physical locations in some embodiments, while in other embodiments, the data centers may comprise a plurality of host systems 201 distributed across a cloud network and/or a combination of physically localized and distributed host systems 201. Data centers may include one or more host systems 201, providing host system hardware 267, a host operating system 265 and/or containerization software 263 such as, but not limited to, the open-source Docker and/or OpenShift software, to execute and run the containerized digital twin module 203 encapsulated within the environment of the containers 270, as shown in FIG. 2*b*. Although the exemplary embodiment depicted in FIG. 2*b* includes three containers 270*a*-270*c*, the embodiment of FIG. 2*b* is merely illustrative of the concept that a plurality of containers 270 can be hosted by a host system 201. The embodiment of FIG. 2*b* should in no way be considered to imply that the host systems 201 is limited to hosting only three containers 270. The number of containers 270 hosted by a host system 201 may vary depending on the amount of computing resources available, based on the host system hardware 267 and the amount of computing resources required by individual digital twin modules 203 being executed within the containers 270 by the containerization software 263.

Embodiments of the containerization software 263 may operate as a software platform for developing, delivering, and running containerized programs and applications, as well as allowing for the deployment of code quickly within the computing environment of the containers 270. Embodiments of containers 270 can be transferred between host systems 201 as well as between different data centers that may be operating in different geolocations, allowing for the containers 270 to run on any host system 201 running containerization software 263. The containerization software 263 enables the host system 201 to separate the containerized applications and programs, such as the containerized digital twin module 203 from the host system hardware 267 and other infrastructure of the host system 201. For example, host system hardware 267 may include one or more processor(s) 103, memory 105, persistent storage 106, cache 107, communications unit 111, communication fabric 112, I/O interface(s) 115, human-readable displays 118 and/or external device(s) 117. The containerization software 263 provides host system 201 with the ability to package and run digital twin module 203 within the isolated environment of the container 270. Isolation and security provided by individual containers 270 may allow the host system 201 to run multiple instances of digital twin module 203 simultaneously on a single host system 201. A container 270 may be lightweight due to the elimination of any need for a hypervisor, typically used by virtual machines. Rather, the containers 270 can run directly within the kernel of the host operating system 265. However, embodiments of digital twin module 203 may benefit from combining virtualization of virtual machines with containerization. For example, the host system 201 may be a virtual machine running containerization software 263.

Embodiments of the containerization software 263 may comprise a containerization engine (not shown). The containerization engine may be a client-server application which may comprise a server program running a daemon process, a REST API specifying one or more interfaces that the digital twin module 203 and/or other programs may use to talk to the daemon process and provide instructions to the digital twin module 203, as well as a command-line interface (CLI) client for inputting instructions. In one embodiment, the client system 227 may input commands using a CLI to communicate with the containerization software 263 of the host system 201. In the exemplary embodiment depicted in FIG. 2b, commands provided by the client system 227 to the host system 201 may be input via the digital twin interface 229 loaded into the memory 105 or persistent storage 106 of the client system 227 interfacing with the host system 201.

Embodiments of the CLI may use the REST API of the containerization engine to control or interact with the daemon through automated scripting or via direct CLI commands. In response to the instructions received from the CLI, via the REST API, the daemon may create and manage the objects of the containerization software 263, including one or more software images residing within the containers 270, the containers 270 themselves, networks, data volumes, plugins, etc. An image may be a read-only template with instructions for creating a container 270 and may be customizable. Containers 270 may be a runnable instance of the software image. Containers 270 can be created, started, stopped, moved or deleted using a containerization software 263 API or via the CLI. Containers 270 can be connected to one or more networks 250, can be attached to a storage device and/or create a new image based on the current state of a container 270.

Embodiments of the host system 201, illustrated in the block diagram of FIG. 2b, depict a plurality of containers 270a-270c, wherein a container 270 may comprise an image of a digital twin module 203 and software dependencies 269a-269c (generally referred to herein as software dependencies 269) for running instances of the digital twin module 203 within the environment of the container 270. Software dependencies 269 may include application code, system tools, settings, runtime environment and system libraries. The images of the digital twin module 203 depicted within the containers 270 may be duplicate versions of the digital twin module 203 image. In some embodiments, the images of the digital twin module 203 may be customized variations of one another, based on a common image used as the basis for the customized variations of the digital twin module 203, while in some embodiments, one or more of the digital twin modules may be independently created and developed using entirely different images.

Method for Simulating a Digital Twin Workflow

Figure 9A:
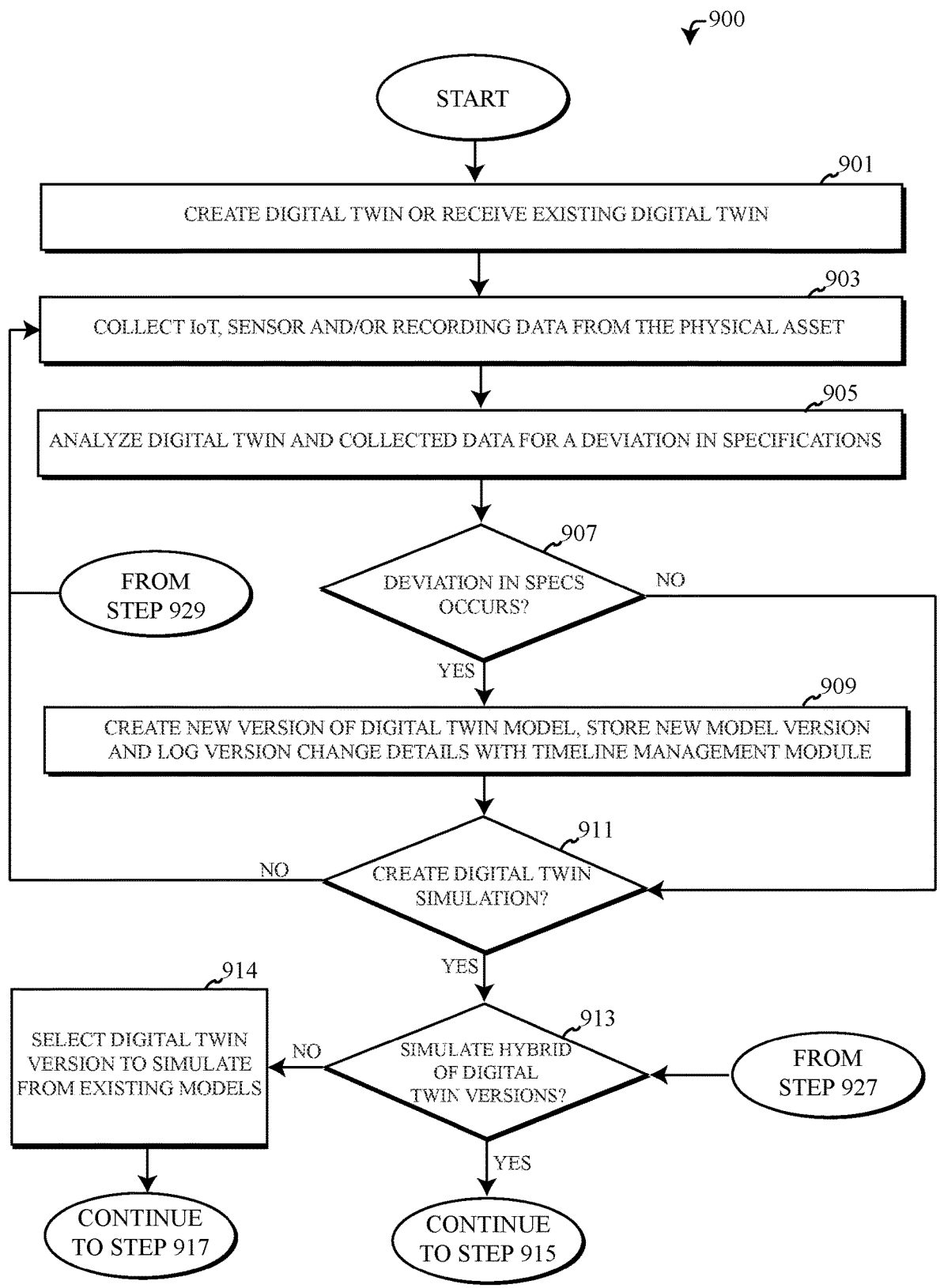
FIG. 9a depicts an embodiment of an algorithm implementing a computerized method for creating and simulating a digital twin in accordance with the present disclosure.
Figure 9B:
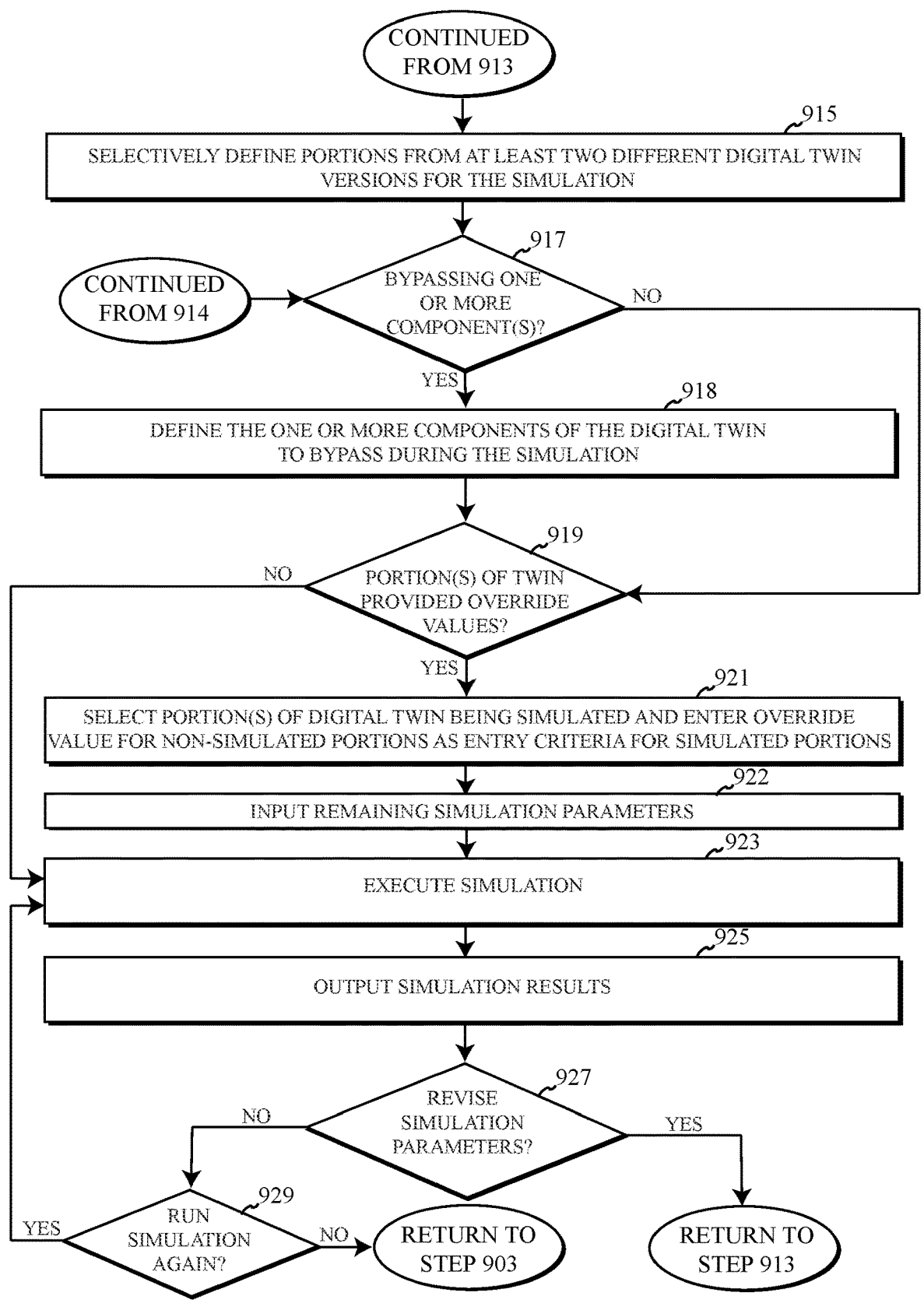
FIG. 9b depicts a continuation of the algorithm of FIG. 9a implementing a computerized method for creating and simulating a digital twin in accordance with the present disclosure.

The drawings of FIGS. 9a-9b represent an embodiment of an algorithm 900 performing a computer-implemented method for simulating the workflow and activities of a physical asset 217 using a digital twin model 233 or a hybrid model 633 of components from multiple digital twin models 233, bypassing one or more input parameters, selectively altering components of the digital twin model 233 and/or inputting overriding values into the digital twin simulation, in order to focus the simulation on particular components or sections of the digital twin model 233. The algorithm 900, may use one or more computer systems, defined generically by data processing system 100 of FIG. 1, and more specifically by the embodiments of specialized data processing systems depicted in FIGS. 2a-8, as described herein. A person skilled in the art should recognize that the steps of the algorithm 900 described in FIGS. 9a-9b may be performed in a different order than presented. The algorithm 900 may not necessarily require all the steps described herein to be performed. Rather, some embodiments of algorithm 900 may alter the methods by performing a subset of steps using one or more of the steps discussed below.

Embodiments of the algorithm 900 may begin at step 901. In step 901, a host system 201 loaded with the digital twin module 203 may receive a request to create a digital twin model 233 of a physical asset 217 or associate an existing digital twin model 233 with a new user or owner of the existing digital twin (i.e., a transfer of ownership of the physical asset 217 and digital twin respectively). Wherein step 901, a new digital twin is requested to be created, the creation engine 205 may create a digital twin model 233 of the physical asset 217 based on the specifications and configuration of the physical asset's 217 current state. For example, for a brand new physical asset 217 delivered from the manufacturer, the initial version of the digital twin model 233 may be an initial version depicting the base form of the physical asset 217, unmodified, whereas an existing physical asset 217 changing ownership could be entered into the digital twin module 203 comprising a plurality of versions 234a-234d of digital twin models 233 documenting changes to the physical asset 217 over a period of time.

In step 903 of algorithm 900, one or more collection devices 219, 221, 223 equipped by the physical asset 217 may collect data during the course of physical asset 217 operations and stored as a collected dataset 235. The collected datasets 235 may be collected in real-time and describe the functionality and performance of the physical asset 217 during operation. Collection devices 219, 221, 223 may include one or more sensor devices 219, IoT devices 221 and recording systems 223 (such as cameras, black box recorders or audio recording devices, etc.). The collected datasets 235 can be stored by repository 231. Embodiments of data collection engine 207 may aggregate, organize and format the data generated by the collection devices 219, 221, 223 for easier searching and recall by the digital twin module 203.

In step 905 of algorithm 900, the collected datasets 235 that are organized and stored by the data collection engine 207 may be analyzed for identifying changes to the digital twin components, changes to configurations, presence of failing components, the need for maintenance, or the presence of other issues that may indicate a deviation in the specifications from representation of the physical asset 217 provided in the current digital twin model 233. A determination is made in step 907, based on the analysis of the collected datasets 235 provided by the data collection engine 207 in step 905, whether or not a deviation in the specification of the digital twin has occurred. If the collected datasets 235 indicate a change to the performance or configuration of the physical asset 217, which should be reflected by the digital twin model 233, or a self-reported change to the physical asset 217 has occurred, the algorithm 900, may proceed to step 909. In step 909, digital twin version management 209 request the creation engine 205 to create a new version 233a-233d of the digital twin model 233 reflecting the change identified in step 905 and step 907. The digital twin version management 209 may time stamp the new version 233a-233d of the digital twin model 233 created, detail changes made in the new digital twin model 233, logging the version changes in one or more log files and store the new digital twin model 233 in the repository 231. Conversely, if a deviation to the specifications has not been detected to have occurred in step 907 and/or no self-reported changes to the physical asset 217 have been applied, the algorithm 900 may proceed from step 907 to step 911.

In step 911 of algorithm 900, a user of the digital twin module 203 may select whether or not to run a digital twin simulation. If a digital twin simulation is not elected to be performed, the algorithm 900 may proceed back to step 903 and continue to collect datasets 235 describing the performance and operations of the physical asset 217 and continue to reflect any changes in the digital twin models 233 and/or create new versions of the digital twin models 233 as changes occur. Conversely, if a digital twin simulation is elected to be performed, the algorithm 900 may proceed to step 913, wherein the user electing to perform the digital twin simulation, may configure the parameters of the simulation using the simulation engine 211. For example, making configurations via digital twin interface 229 or via an AR device displaying digital twin interface 229.

In step 913, the algorithm 900 may determine which type of digital twin model 233 is being used to run the simulation. A determination may be made whether the user has configured the parameters of the simulation to use a most recent version of the digital twin model 233 stored by repository 231, one of the previous versions of the digital twin models 233 or a hybrid model 633 comprising selected portions 601, 603, 605 or components from a combination of two or more digital twin models 233. If the simulation engine 211 detects a configuration set to include a hybrid of two or more different versions 233a-233d of a digital twin model 233, the algorithm may proceed to step 915. If, however, the simulation parameters are configured to include a single version of a digital twin model 233, the algorithm 900 may proceed to step 914, wherein the user may input a selected version of an existing digital twin model 233 to simulate into the simulation engine 211, from one of the digital twin models 233 maintained by repository 231. From step 914, the algorithm 900 may proceed to step 917.

In step 915 of the algorithm 900, parameters of the simulation may be configured for using a hybridized version of digital twin models 233 by combining two or more versions 233a-233d of digital twin models 233 into a single hybrid model 633, in a manner similar to the depiction of FIG. 6. In step 915, a user may selectively define and/or combine portions or components from a plurality of digital twin models 233 by inputting one or more selections into the simulation engine 211 via the digital twin interface 229. In some embodiments, a graphical user interface (GUI) may display numerous digital twin models 233 to select, and a user may drag and drop components from various individual digital twin models 233 to create a digital twin model 233 comprising a hybrid of parts and components from the several versions 233a-233d of the digital twin that may be available to the user. For example, creating a hybrid digital twin 633 by selecting a first component 601 from a first digital twin model version 233a, a second component 603 (or set of components) from digital twin model version 233b and a third component 605 (or set of components) from digital twin model version 233d. In some embodiments, A user can use an AR device to selectively map the different portions of the different digital twin models 233 into a hybrid model 633 by selecting the various components of the digital models 233 in AR space and building the hybrid model 633.

In step 917 of the algorithm 900, a determination may be made whether a user has selected to configure the simulation to bypass one or more of the components in the digital twin model 233 or the hybrid model 633 configuration. If a user has not elected to configure the simulation to bypass one or more components, the algorithm may proceed from step 917 to step 919, otherwise, the algorithm 900 may proceed to step 918. In step 918, the user may select and define one or more components of the digital twin model 233 that the simulation engine 211 will bypass (a bypassed component 701) during the performance of the simulation. Bypassing the one or more of the components of the digital twin model 233 during the simulation may allow for the user to focus the simulation results on the remaining components. Allowing for the user to perform multiple simulations and observe how changes to the components or configuration of components of interest affect the overall simulation results, without having to account for additional variables that could be introduced by the inclusion of the bypassed components 701 into the simulation. In some embodiments of the simulation engine 211, a user may select one or more alternatives to substitute for the bypassed component 701. In some embodiments, the user may configure and arrange for multiple simulations to be performed back to back and the user may input a list comprising multiple alternatives that can be substituted for the bypassed component 701 and the order of the simulations within which the alternatives can be substituted for the bypassed component 701.

In some embodiments, the user may configure one or more overriding values 803 for one or more portions or components of the digital twin model 233 and input the overriding values 803 as an intermediate simulation result for the simulation engine 211 to use during the simulation of the digital twin model 233. In step 919, a determination is made whether the user has selected to input overriding values 803 into the simulation engine 211 for one or more portions of the digital twin model 233. If overriding values 803 are not being selected or provided by the user, the algorithm may proceed to step 922. If, the user has selected to input one or more overriding values 803, in step 921, the user may select one or more portions or components of the digital twin model 233 being used for the simulation and enter one or more overriding values 803 into the simulation engine 211 for the non-simulated portions or components and/or intermediate results to use for the remaining portion selected to be simulated utilizing the overriding values 803 as input. The overriding values 803 inputted by the user for the non-simulated portions or components may be used as entry criteria for the selected components 801. For example, a non-simulated component may precede the operation of a simulated selected component 801, wherein the overriding values 803 inputted of the non-simulated component directly affects the output of the selected component 801. Accordingly, the overriding value 803 provided for the non-simulated component may be used as the output value of the non-simulated component and thus also the input value for the simulation of the component being simulated by the simulation engine 211.

In step 922 of the algorithm 900, the simulation engine 211 may advise the user of the digital twin module 203 of any remaining input parameters to enter before executing the simulation. A user configuring the parameters of the simulation may enter the remaining input parameters as requested by the simulation engine 211 and proceed to engaging the performance of the simulation in step 922, wherein the simulation is executed in accordance to the configuration provided via steps 913-922. In step 925 of the algorithm 900, the simulation engine 211 may output the simulation results. Embodiments of the digital twin module 203 may further report the output of the simulation from the simulation engine 211 to one or more client systems 227 via the reporting engine 213. The reporting engine 213 may display the outputted results of the simulation in one or more reports that may include datasets that can be formatted or organized by the user in order to display the desired levels of detail the user seeks to review from the output of the simulation. For example, the user can configure the reporting engine 213 to provide detailed levels of reporting about the simulation results or the user can configure the reporting engine 213 to summarize the output values from the simulation engine 211.

Users receiving the simulation results from step 925 may seek to further refine the simulation or adjust one or more parameters and compare the difference in results. In some instances, users may simply seek to re-run the same simulations multiple times where variations in the outputted results may be observed. In step 927, the algorithm 900 may determine whether the user has elected to revise one or more of the simulation parameters for a previously outputted simulation. If the determination is made by the simulation engine 211 that the user has elected not to revise the parameters of the simulation, the algorithm 900 may proceed to step 929 and further determine whether the user has selected to run the same simulation again or not. A determination that the user has elected to run the same simulation again using the previous set of parameters inputted into the simulation engine 211, the algorithm 900 may return to step 923, re-execute the simulation and output the results. Conversely, if in step 929 a determination is made by the algorithm 900 that the user is not running the simulation again with the same set of input parameters, the algorithm 900 may return to step 903. Moreover, if in step 927, a determination is made that the user has selected to revise one or more input parameters of the simulation previously performed, the algorithm 900 may return to step 913, allowing for the user to revise one or more input parameters entered into the simulation engine 211, including the selection of a digital twin model 233 or selected portions 601, 603, 605 of digital twin models 233 to create a hybrid model 633 and execute the simulation in accordance with the selected digital twin model 233, hybrid model 633, bypassed components 701, overriding values 803 and/or other input parameters configured by the user.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
creating, by a processor, a digital twin model representing a physical asset, wherein a real-time data feed from a data collection device describes components and performance of the physical asset and reflects the components and the performance of the physical asset in the digital twin model;
mapping, by the processor, a simulation using the digital twin model;
selecting, by the processor, one or more components of the digital twin model being bypassed during simulation of the digital twin model;
executing, by the processor, the simulation multiple times, changing the one or more components being bypassed in each simulation with selected alternative components; and
outputting, by the processor, predicted effects of substituting bypassed components for selected alternative components on the physical asset.

2. The computer-implemented method of claim 1, wherein the step of selecting one or more components being bypassed during the simulation is performed using an augmented reality (AR) device.

3. The computer-implemented method of claim 2, wherein the digital twin model being simulated is a hybrid digital twin model comprising a combination of components from at least two different versions of the digital twin model.

4. The computer-implemented method of claim 3, further comprising:
constructing the hybrid digital twin model in real time by touching the digital twin model being displayed in AR space and mapping portions of different digital twin models to the hybrid digital twin model being simulated.

5. The computer-implemented method of claim 1, further comprising:
substituting a value representing output from each of the selected alternative components is provided as an intermediate simulation result, rather than the one or more components being bypassed during the simulation.

6. The computer-implemented method of claim 1, further comprising:

outputting, by the processor, intermediate simulation results during each simulation;

verifying, by the processor, the intermediate simulation results before proceeding to a next stage of the simulation; and upon verification of the intermediate simulation results, applying the intermediate simulation results to a downstream simulation.

7. The computer-implemented method of claim 1, wherein a data collection device is selected from the group consisting of a sensor device, internet-of-things (IoT) device, a recording system and a combination thereof.

8. A computer system comprising:
a processor; and
a computer-readable storage media coupled to the at least one processor, wherein the computer-readable storage media contains program instructions executing a computer-implemented method comprising:
creating, by the processor, a digital twin model representing a physical asset, wherein a real-time data feed from a data collection device describes components and performance of the physical asset and reflects the components and the performance of the physical asset in the digital twin model;
mapping, by the processor, a simulation using the digital twin model;
selecting, by the processor, one or more components of the digital twin model being bypassed during simulation of the digital twin model;
executing, by the processor, the simulation multiple times, changing the one or more components being bypassed in each simulation with selected alternative components; and
outputting, by the processor, predicted effects of substituting bypassed components for selected alternative components on the physical asset.

9. The computer system of claim 8, wherein the step of selecting one or more components being bypassed during the simulation is performed using an augmented reality (AR) device.

10. The computer system of claim 9, wherein the digital twin model being simulated is a hybrid digital twin model comprising a combination of components from at least two different versions of the digital twin model.

11. The computer system of claim 10, further comprising: constructing the hybrid digital twin model in real time by touching the digital twin model being displayed in AR space and mapping portions of different digital twin models to the hybrid digital twin model being simulated.

12. The computer system of claim 8, further comprising: substituting a value representing output from each of the selected alternative components is provided as an intermediate simulation result, rather than the one or more components being bypassed during the simulation.

13. The computer system of claim 8, further comprising: outputting, by the processor, intermediate simulation results during each simulation;

verifying, by the processor, the intermediate simulation results before proceeding to a next stage of the simulation; and upon verification of the intermediate simulation results, applying the intermediate simulation results to a downstream simulation.

14. The computer system of claim 8, wherein a data collection device is selected from the group consisting of a sensor device, internet-of-things (IoT) device, a recording system and a combination thereof.

15. A computer program product comprising:
one or more computer-readable storage media having computer-readable program instructions stored on the one or more computer-readable storage media said program instructions executes a computer-implemented method comprising the steps of:
creating, by a processor, a digital twin model representing a physical asset, wherein a real-time data feed from a data collection device describes components and performance of the physical asset and reflects the components and the performance of the physical asset in the digital twin model;
mapping, by the processor, a simulation using the digital twin model;
selecting, by the processor, one or more components of the digital twin model being bypassed during simulation of the digital twin model;
executing, by the processor, the simulation multiple times, changing the one or more components being bypassed in each simulation with selected alternative components; and
outputting, by the processor, predicted effects of substituting bypassed components for selected alternative components on the physical asset.

16. The computer program product of claim 15, wherein the step of selecting one or more components being bypassed during the simulation is performed using an augmented reality (AR) device.

17. The computer program product of claim 16, wherein the digital twin model being simulated is a hybrid digital twin model comprising a combination of components from at least two different versions of the digital twin model.

18. The computer program product of claim 17, constructing the hybrid digital twin model in real time by touching the digital twin model being displayed in AR space and mapping portions of different digital twin models to the hybrid digital twin model being simulated.

19. The computer program product of claim 15, further comprising:
outputting, by the processor, intermediate simulation results during each simulation;
verifying, by the processor, the intermediate simulation results before proceeding to a next stage of the simulation; and
upon verification of the intermediate simulation results, applying the intermediate simulation results to a downstream simulation.

20. The computer program product of claim 15, wherein a data collection device is selected from the group consisting of a sensor device, internet-of-things (IoT) device, a recording system and a combination thereof.

* * * * *